United States Patent [19]

Abe et al.

[11] Patent Number: 5,494,385
[45] Date of Patent: Feb. 27, 1996

[54] V-SHAPED GROOVE FORMING MACHINE

[75] Inventors: Nobuo Abe; Nobuyuki Kinnou; Toshihide Ohara; Kazunori Kuga, all of Kanagawa; Yoshiharu Komizo, Tokyo; Takara Kibe; Hideyuki Fujikawa, both of Kanagawa, all of Japan

[73] Assignee: Amada Company Limited, Japan

[21] Appl. No.: 397,480

[22] Filed: Mar. 2, 1995

Related U.S. Application Data

[63] Continuation of Ser. No. 1,556, Jan. 6, 1993, Pat. No. 5,399,049, which is a continuation of Ser. No. 706,326, May 28, 1991, abandoned, which is a continuation of Ser. No. 447,549, Dec. 7, 1989, abandoned, which is a division of Ser. No. 216,534, Jul. 8, 1988, Pat. No. 5,080,540.

[30] Foreign Application Priority Data

| Aug. 7, 1987 | [JP] | Japan | 62-168561 |
| Dec. 22, 1987 | [JP] | Japan | 62-193401 |
| Jan. 27, 1988 | [JP] | Japan | 63-14615 |
| Jun. 14, 1988 | [JP] | Japan | 63-144774 |

[51] Int. Cl.$^6$ ............... B23D 7/00; B23Q 5/40
[52] U.S. Cl. ............... 409/304; 409/333
[58] Field of Search ............... 409/259, 275, 409/285, 287, 304, 317, 320, 326, 324, 327, 344, 345, 348; 83/875, 425, 437

[56] References Cited

U.S. PATENT DOCUMENTS

| 3,242,780 | 3/1966 | Ried et al. . | |
| 3,370,508 | 2/1968 | Iaia . | |
| 3,420,142 | 1/1969 | Gale et al. . | |
| 3,457,834 | 7/1969 | Seeloff | 409/333 X |
| 3,605,534 | 9/1971 | Barr . | |
| 3,875,835 | 4/1975 | Roberts . | |
| 3,995,516 | 12/1976 | Boily et al. . | |
| 4,005,808 | 2/1977 | Insolio . | |
| 4,348,924 | 9/1982 | Jenker . | |
| 4,506,575 | 3/1985 | McCay et al. . | |
| 4,549,452 | 10/1985 | Jobst . | |
| 4,649,780 | 3/1987 | Takeuchi et al. . | |
| 4,786,219 | 11/1988 | Oberlin et al. . | |
| 5,078,559 | 1/1992 | Abe et al. . | |
| 5,080,540 | 1/1992 | Abe et al. . | |

FOREIGN PATENT DOCUMENTS

| 1027961 | 4/1958 | Germany | 409/333 |
| 45510 | 2/1989 | Japan | 409/304 |
| 1238377 | 7/1971 | United Kingdom . | |
| 8703240 | 6/1987 | WIPO . | |

Primary Examiner—William Briggs
Attorney, Agent, or Firm—Wigman, Cohen, Leitner & Myers

[57] ABSTRACT

A dedicated V-shaped groove forming machine comprises an X-axis slider disposed over a plate material so as be movable in an X-axis (groove forming direction); a Z-axis slider supported by the X-axis slider so as to be movable in a Z-axis direction (vertical direction); and plural cutting tools mounted on the Z-axis slider; and a Y-axis carriage for moving a plate material (workpiece) in a Y-axis direction (perpendicular to the X-axis direction). Further, there are provided work table adjusting device for adjusting the cutting tool movement locus in parallel to the work table and tool height detecting device for determining an origin in the Z-axis direction, etc.

3 Claims, 10 Drawing Sheets

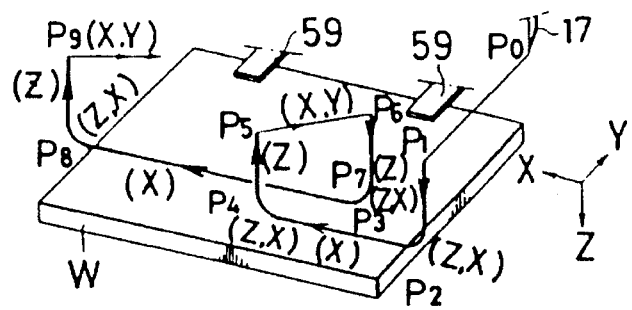
FIG.18
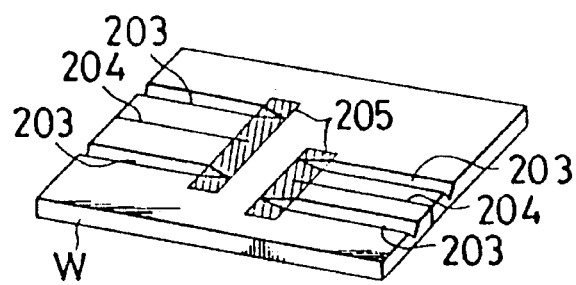
FIG.19
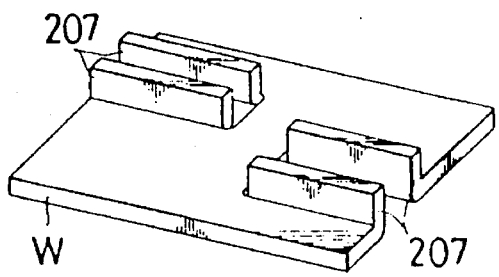
FIG.20
FIG.21
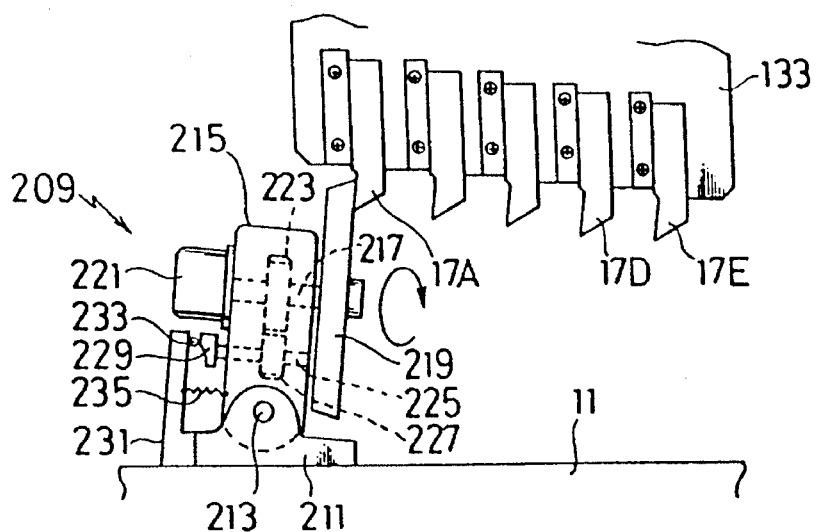

V-SHAPED GROOVE FORMING MACHINE

This is a continuation of application Ser. No. 08/001,556 filed on Jan. 6, 1993, now U.S. Pat. No. 5,399,049, which is a continuation of abandoned application Ser. No. 07/706, 326, filed on May 28, 1991, which is a continuation of abandoned application Ser. No. 07/447,549, filed on Dec. 7, 1989, which is a divisional of application Ser. No. 07/216, 534, filed on Jul. 8, 1988, now U.S. Pat. No. 5,080,540.

BACKGROUND OF THE INVENTION

1. Field of the Invention

The present invention relates to a V-shaped groove forming machine for forming V-shaped grooves on a surface of a plate material and its control method.

2. Description of the Prior Art

When a box-shaped product, for instance is manufacture by bending a plate material, conventionally V-shaped grooves are previously formed on one surface of a plate material, in order to reduce the radius of curvature at the bent portions of the plate material, before bending the plate material with the formed grooves inward. Where V-shaped grooves are formed on one surface of a plate as described above, it is possible to use a shaper or a planomirror; however, when the size of the plate material is large, there exists a problem in that it is difficult to form V-shaped grooves. That is, since there exists no dedicated machine for forming V-shaped grooves on one surface of a plate material, it has been difficult to freely start or end the V-shaped groove forming operation from or at any given position. Further, there exists another problem in that the workability or machinability is not high when the number of grooves or the number of plates to be machined increases.

SUMMARY OF THE INVENTION

With these problems in mind, therefore, it is the primary object of the present invention is to provide a V-shaped groove forming machine which can easily form V-shaped grooves on one surface of a plate material and its control method.

The second object of the present invention is to provide a V-shaped groove forming machine which can start and end V-shaped groove forming operation from or at any given position, and its control method.

To achieve the above-mentioned object, the V-shaped groove forming machine according to the present invention basically comprises: (a) an X-axis slider disposed opposing one surface of a plate material mounted on a work table and reciprocably movable in an X-axis direction; (b) a Z-axis slider supported by said X-axis slider and reciprocably movable in a Z-axis direction; and (c) a cutting tool mounted on said Z-axis slider to form a V-shaped groove on one surface of the plate material.

Further, the method of controlling a V-shaped groove forming machine according to the present invention basically comprises; (a) controlling an X-axis direction stroke of an X-axis slider disposed over a work table for supporting a plate material so as to be reciprocably movable in an X-axis direction; (b) providing a cutting tool for forming a V-shaped groove on one surface of the plate material; (c) controlling a Z-axis direction stroke of a Z-axis slider supported by said X-axis slider so as to be movable up and down; and (d) controlling a cutting start position, a cutting end position, and a cutting depth of the cutting tool relative to the plate material in order to form a V-shaped groove on the plate material in the X-axis direction.

BRIEF DESCRIPTION OF THE DRAWINGS

The features and advantages of the V-shaped groove forming machine and its control method according to the present invention will be more clearly appreciated from the following description taken in conjunction with the accompanying drawings in which:

FIG. 18 is a view for assistance in explaining a locus of a cutting tool;

FIG. 19 is a view for assistance in explaining an example of formed V-shaped grooves;

FIG. 20 is a view for assistance in explaining an example of a product; and

FIG. 21 is a view for assistance in explaining a grinding method of the cutting tool.

DETAILED DESCRIPTION OF THE PREFERRED EMBODIMENTS

Figure 1:
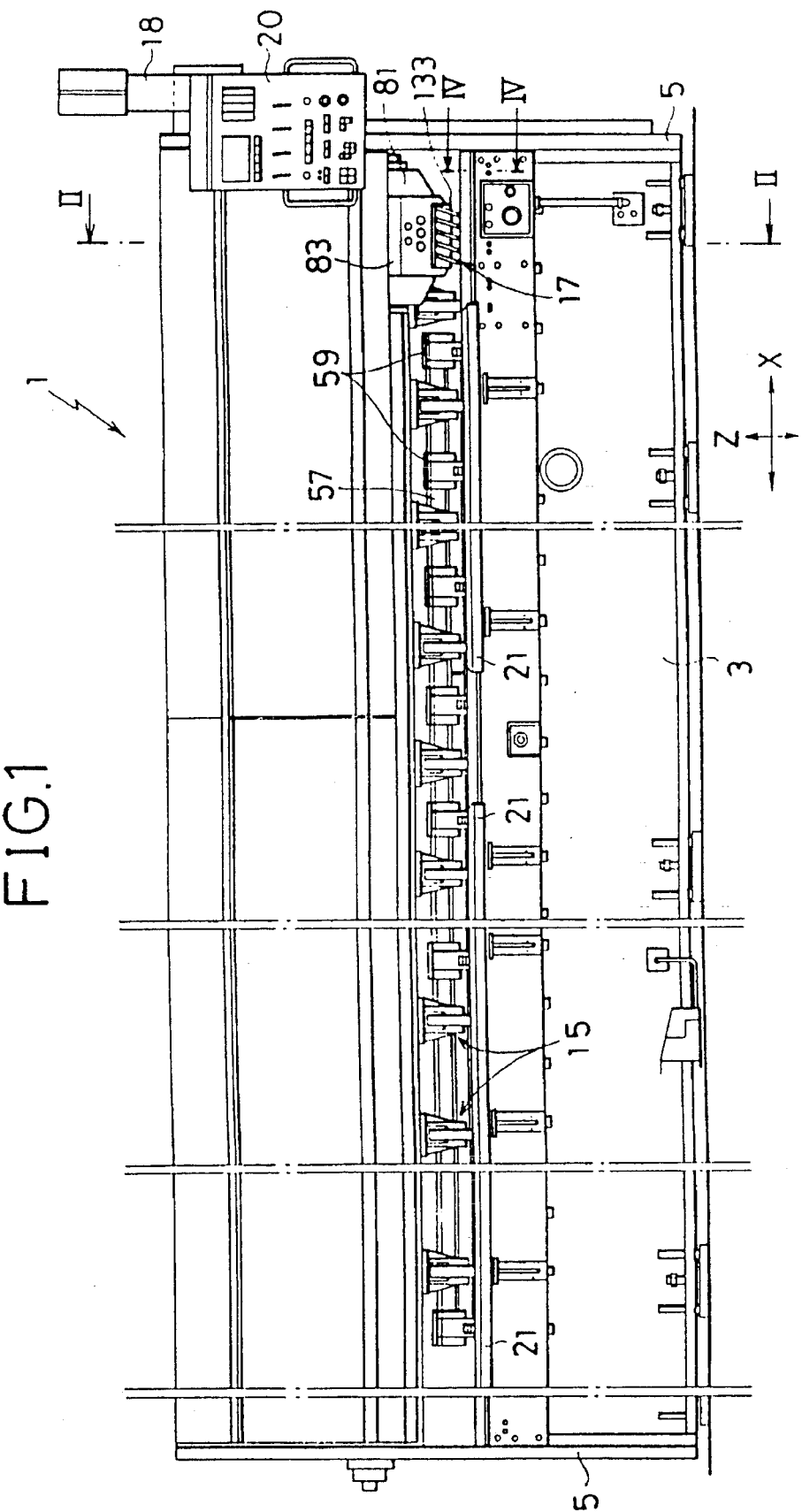
FIG. 1 is a front view showing an embodiment of the V-shaped groove forming machine according to the present invention.
Figure 2:
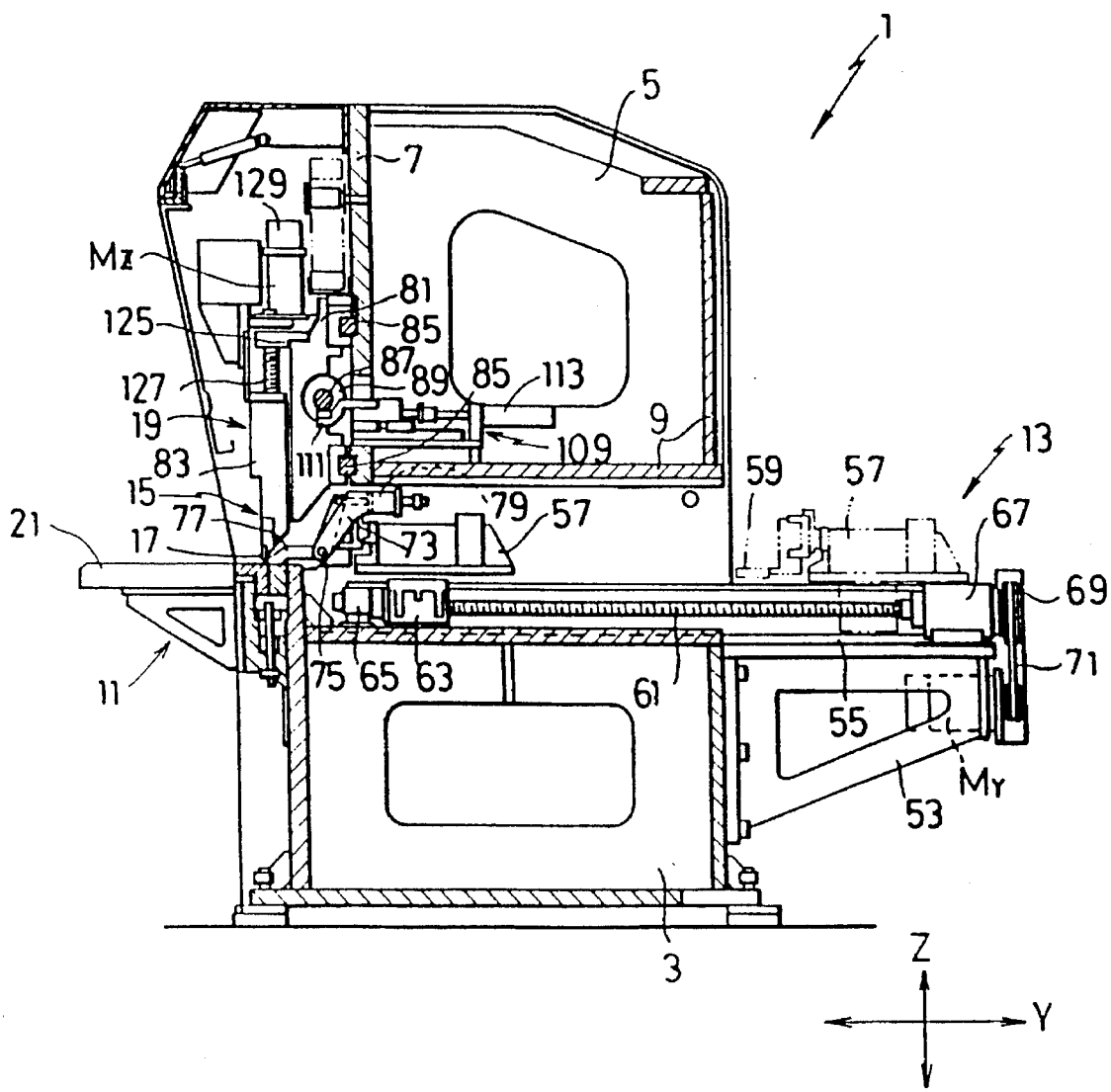
FIG. 2 is a cross-sectional view taken along the line II—II shown in FIG. 1.
Figure 3:
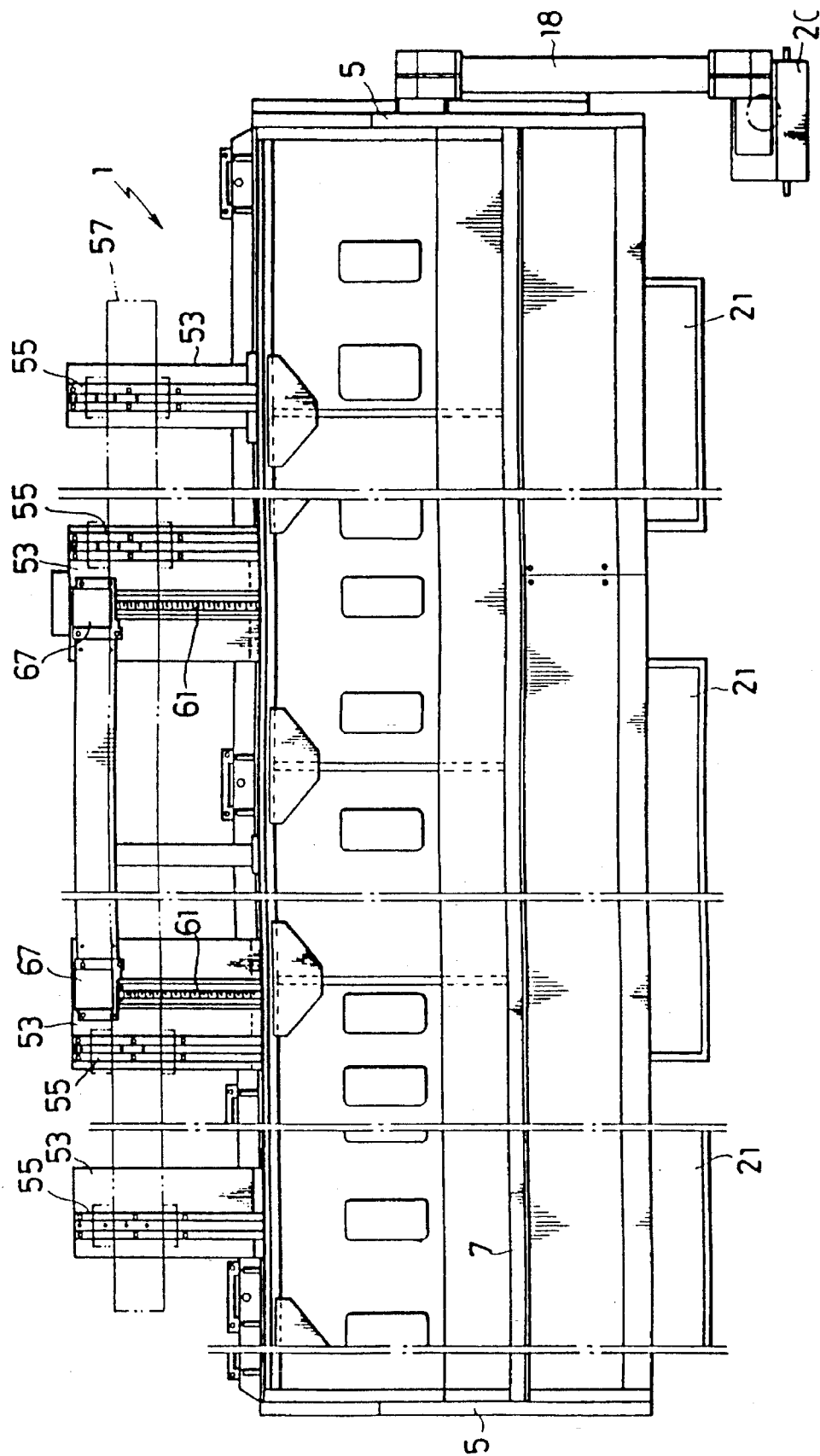
FIG. 3 is a plan view of FIG. 3.

With reference to FIGS. 1 to 3, an embodiment of a V-shaped groove forming machine 1 according to the present invention is provided with a relatively long box-shaped lower frame 3 extending in the right and left direction (X-axis direction). Further, two, right and left, side plates 5 are vertically provided on both sides of this lower frame 3. These side plates 5 are connected to each other together by a vertical front plate 7 and an appropriate connecting plate 9. In other words, the frame of this groove forming machine 1 is composed of a lower frame 3 and an upper frame (i.e. the front plate 7).

To support a plate material W to be machined (not shown in FIG. 1 to 3), a work table 11 is provided in front of the lower frame 3. Further, a moving/positioning device 13 for clamping a plate material W and moving it in the front and back direction (Y-axis direction) to position a work material is mounted on the lower frame 3. Additionally, a pressure fixing device 15 for fixing by pressure the plate material W positioned by the moving/positioning device 13 against the work table 11 is provided over the lower frame 3, and a tool head 19 provided with adjastably vertically movable (in Z-axis direction) cutting tool 17 for forming a V-shaped groove on the upper surface of the fixed plate material W is also provided so as to be movable to and fro in the right and left direction (X-axis direction).

Further, a control board 20 including various control devices is provided being supported by a post 18 on one side of the frame 3. This control board 20 is used to enter various data for moving and positioning the plate material in the Y-axis direction and the cutting tool 17 in the X- and Z-axis directions, and to operate various devices of the groove forming machine 1.

As roughly understood by the above description, in this groove forming machine 1, a V-shaped groove extending in the X-axis direction can be formed on the upper surface of the plate material W by moving and positioning the plate material W in the Y-axis direction by the moving/positioning device 13, pressure fixing the plate material W against the work table 11 by the pressure fixing device 15, adjusting a cutting depth of the cutting tool 17 into the plate material W, and moving the cutting head 19 in the X-axis direction.

Figure 4:
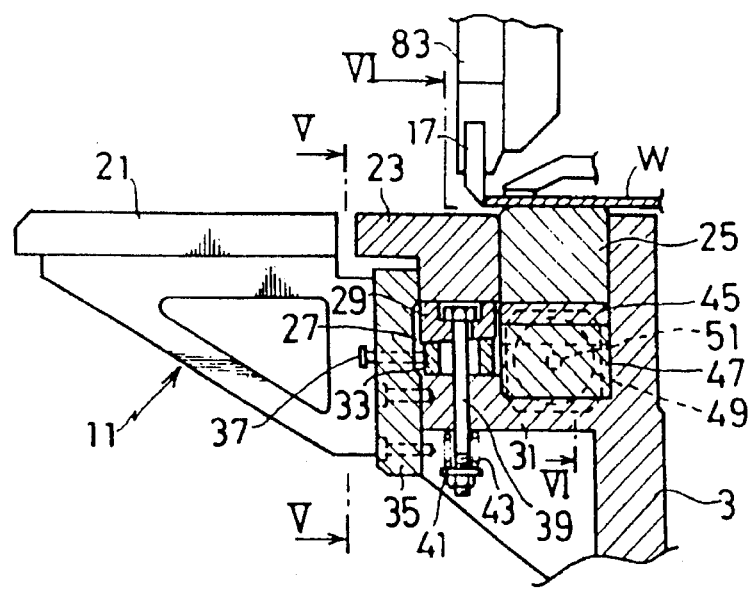
FIG. 4 is an enlarged cross-sectional view taken along the line IV—IV shown in FIG. 1.
Figure 5:
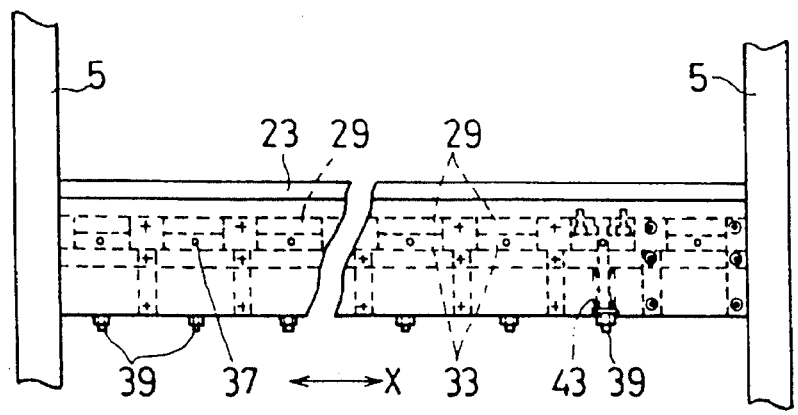
FIG. 5 is a diagrammatical view when seen from the line V—V shown in FIG. 4.

As shown in detail in FIG. 4, the work table 11 is composed of a plurality of subtables 21 arranged horizontally in front of the lower frame 3, and an adjust table 23 and a left table 25 both vertically adjustably disposed between the subtable 21 and the lower frame 3.

Both the adjust table 23 and the left table 25 are provided side by side so as to extend in the X-axis direction and engage with a recess 27 formed on the front side of the lower frame 3.

On the lower surface of the adjust table 23, a plurality of inclined blocks 29 are arranged at appropriate regular intervals in the longitudinal direction. Wedge blocks 23 are adjustably disposed between each inclined block 29 and a bottom 31 of the recess 27. This wedge block 33 is adjustably moved by rotating an adjust screw 37 supported by a bracket 35 mounted on the lower frame 3. A tension bolt 39 passing through the bottom 31 of the recess 27 is provided for each inclined block 29, and a coil spring 43 is elastically disposed at the lower end of the bolt 39 via a spring washer 41.

Owing to the above construction, it is possible to vertically adjust plural positions along the longitudinal direction of the adjust table 23 by rotating each adjust screw 37 to move each wedge block 33. That is, the upper surface of the adjust table 23 can be adjusted horizontally. In addition, when there exists a small height difference (undulation) along the movement locus of the cutting tool 17 moved in the X-axis direction, it is also possible to produce the undulation of the upper surface of the adjust table 23 along the movement locus of the cutting tool 17. Therefore, even if the cutting tool 17 is moved in the X-axis direction with an undulation, it is possible to form a V-shaped groove with a uniform depth throughout the width of the plate material W.

Figure 6:
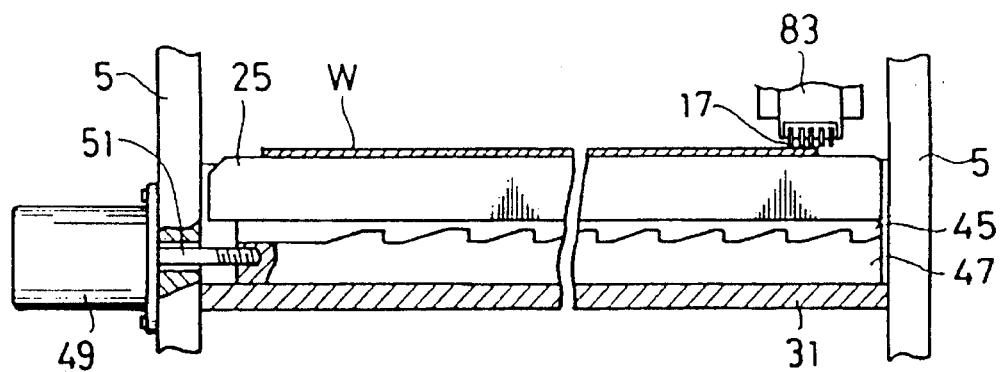
FIG. 6 is a cross-sectional view taken along the line VI—VI shown in FIG. 4.

As shown in FIG. 6, a saw-toothed block 47 is mounted on the lower surface of the lift table 25, and a saw-toothed wedge block 47 intervenes between this block 45 and the bottom 31 of the recess 27. This wedge block 47 is slidable in the longitudinal direction because an end thereof is connected via a piston rod 51 to a hydraulic cylinder 49 mounted on one side plate 5.

Owing to the above construction, when the hydraulic cylinder 49 is actuated to move the wedge block 47 toward the left in FIG. 6, the lift table 25 is lifted beyond the adjust table 23. As shown in FIG. 4, since an edge of the plate material W placed on the lift table 25 can be floated over the adjust table 2, it is possible to cut off the end of the plate material W by the cutting tool 17; that is, it is possible to deburr or finish the side end surface of the plate material material W, where necessary.

The moving/positioning device 13 for moving and positioning the plate material W in the Y-axis direction will be described hereinbelow. That is, with reference to FIGS. 2 and 3, a plurality of brackets 53 are mounted on the rear side of the lower frame 3, and a guide rail 55 extending in the Y-axis direction to near the work table 11 is laid on each bracket 53. Further, a Y-axis carriage 57 extending in the X-axis direction is movably supported on each guide rail 55 via slidable members (not shown), and a plurality of work clamps 59 for clamping the rear end of the plate material W are mounted on this Y-axis carriage 57. This work clamp 59 is of conventional type which includes an upper jaw and a lower jaw, therefore the description thereof being omitted herein. Further, the plural work clamps 59 are divided into 3 groups so as to clamp a plate material W of different size according to the size thereof.

To move the Y-axis carriage 57 in the Y-axis direction, several ball screws 61 parallel to the guide rail 55 are arranged. A nut member 63 fixed to the Y-axis carriage 57 is engaged with each ball screw 61. Each ball screw 61 is rotatably supported by a bearing 65 and a gear box 67 and connected to each other through an appropriate power transmission means such as bevel gears, transmission shafts, belts, etc. Further, a pulley 69 is fixed to one end of the ball screw 61, and this pulley 69 is connected to a Y-axis servomotor via a timing belt 71.

Owing to the above construction, when a Y-axis servomotor $M_y$ is controllably driven, the ball screw 61 is driven and therefore the Y-axis carriage 57 is moved along the guide rail 55 in the Y-axis direction, to move and position the plate material W clamped by the work clamps 59 mounted on the Y-axis carriage 57 in the Y-axis direction.

The plural pressure fixing devices 15 for pushing the plate material W positioned by the moving/positioning device 13 against the work table 11 are mounted under the front plate 7 as shown in FIG. 2, being arranged in the X-axis direction as shown in FIG. 1. In more detail, each pressure fixing device 15 is provided with a bell crank shaped push arm 77 pivotably supported via a pivotal axle 75 by a bracket 73 mounted on the lower part of the front plate. To pivot this push arm 77 in the vertical direction, a hydraulic cylinder 79 is mounted on the bracket 73 and a piston rod of this hydraulic cylinder 79 is pivotably connected to the push arm 77.

Owing to the above construction, the push arm 77 is moved up and down when the hydraulic cylinder 7 is operated. Therefore, when the push arm 77 is pivoted downward, the plate material W is pushed against the work table 11 to fix it; on the other hand, when the push arm 77 is pivoted upward, the plate material W is released from the work table to unfix it.

Further, although not shown, a plate thickness detecting apparatus for detecting the plate thickness of the plate material W is provided for the push arm 77. This plate thickness detecting device detects a plate thickness with the upper surface of the work table 11 as its basis. That is, when the push arm 77 is in contact with the upper surface of the work table 11, the thickness of the plate is assumed to be zero. The plate thickness can be detected by measuring a pivotal distance of the push arm 77.

The cutting head 19 is provided with an X-axis slider 81 reciprocably movable in the X-axis direction and a Z-axis slider 83 vertically movably supported by this X-axis slider 81. The cutting tool 17 is attached to the lower side of the Z-axis slider 83.

In more detail, as shown in FIG. 2, the X-axis slider 81 is movably supported by an X-axis direction guide rail 85 mounted on the front side of the front plate 7. Further, a nut member 89 provided for the X-axis slider 81 is engaged with a ball screw 87 arranged in parallel to the guide rail 85.

Figure 7:
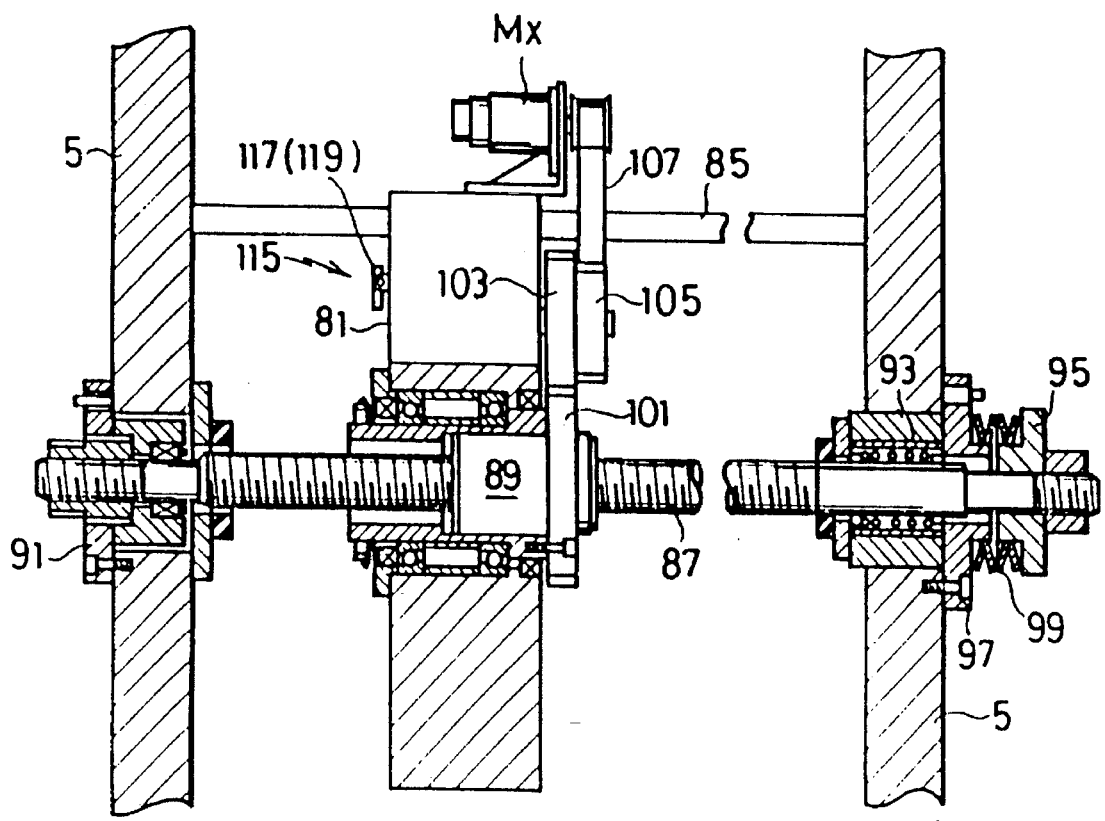
FIG. 7 is a cross-sectional view showing a motion mechanism of the X-axis slider.

As understood by FIG. 7, one end of the ball screw 87 is fixed to one of the side plates 5 via a fixed flange 91, while the other end of the ball screw 87 is movably supported in the axial direction by a ball bush 93 mounted on the other of the side plates 5. A spring washer flange 95 is attached to the other end of the ball screw 87, and an elastic member 99 such as a disk spring or elastic rubber is elastically disposed between this spring washer flange 95 and a spring washer 97 mounted on the side plate 5. Therefore, a tension is always applied to the ball screw 87.

To move the X-axis slider 81 in the X-axis direction, the nut member 89 movably engaged with the ball screw 87 is rotatably (but not slidable) supported by the X-axis slider 81 via the ball bearing. Further, an intermediate gear 103 rotatably supported by the X-axis slider 81 is engaged with a gear formed integral with this nut member 89. A pulley 105 formed integral with this intermediate gear 103 is linked with an X-axis servomotor $M_x$ mounted on the X-axis slider 81 via a timing belt 107.

Owing to the above construction, when the X-axis servomotor $M_x$ is controllably driven, the nut member 89 is rotated and therefore the X-axis slider 81 is moved in the X-axis direction, so that the Z-axis slider 83 supported by the X-axis slider 81 is also moved together.

On the other hand, when the length of the ball screw 87 is large along the X-axis direction, the ball screw 87 is bent by its weight. To prevent the ball screw 87 from being bent, a plurality of support devices 109 for supporting the intermediate portion of the ball screw 87 are provided, as shown in FIG. 2, in the X-axis direction. In each support device 109, a support portion 111 for supporting the ball screw 87 is so provided as to be movable to and fro in the Y-axis direction when a cylinder 113 mounted on the upper frame is operated. That is, each support portion 111 is so constructed as to be moved backward in the Y-axis direction whenever the X-axis slider 81 approaches in order to avert the interference with the X-axis slider 81.

Therefore, the bending of the ball screw 87 due to its own weight can be prevented, and therefore the X-axis slider 81 can be moved smoothly along the ball screw 87.

Figure 8:
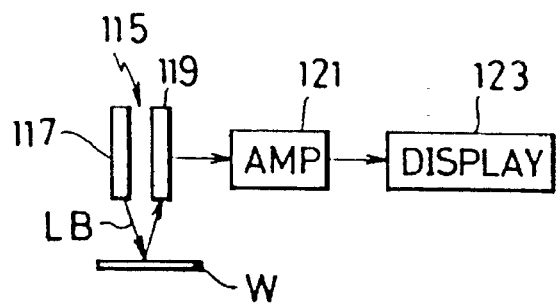
FIG. 8 is a block diagram of an optical making-off line detecting apparatus.

With reference to FIG. 7 again, a making-off (scribed) line detecting apparatus 115 for detecting a making-off line scribed on the upper surface of the plate material W is mounted on an appropriate position of the X-axis slider 81. This making-off line detecting apparatus 115 detects whether a making-off line position scribed on the upper surface of a plate material W is located at a position of the cutting tool 17. Although a detecting apparatus of needle contact type for detecting a contact between a needle and a making-off line on the surface of the plate material W can be used, an optical detecting apparatus is adopted in this embodiment as shown in FIG. 8. In FIG. 8, the apparatus comprises an He-Ne laser emitting device 117 and a laser receiving device 119, which can detect the presence or absence of a making-off line by detecting whether a laser beam LB emitted from the emitting device 117 and then reflected from the upper surface of the plate material W is received by the laser receiving device 119 or the intensity of the received light changes markedly. The received signal is amplified by an amplifier 121 and then applied to a display unit 123 by which the operator can discriminate the presence or absence of a making-off line on the basis of change in the received signal intensity.

Owing to the above construction, it is possible to detect whether a making-off line scribed on the plate material W moved to and fro in FIG. 2 by the Y-axis carriage 57 is correctly located just under the cutting tool 17. In other words, it is possible to control the movement of the Y-axis carriage 57 so that the making-off line on the plate material W is located just under the cutting tool 17 for providing an accurate plate material positioning operation.

With reference to FIG. 2 again, in order to move the Z-axis slider 83 up and down relative to the X-axis slider 81, a Z-axis servomotor $M_z$ is mounted on the X-axis slider 81 via the blacket 25. A ball screw 127 linked to this Z-axis servomotor $M_z$ is engaged with a number member (not shown) provided for the Z-axis slider 83. Further, a position detector 129 such as rotary encoder is provided for this Z-axis servomotor $M_z$. Therefore, when the Z-axis servomotor $M_z$ is controllably driven, it is possible to move the Z-axis slider up and down to an any desired position.

The cutting tool 17 for forming a V-shaped groove on the upper surface of a plate material W is mounted on the lower part of the Z-axis slider 83.

Figure 9:
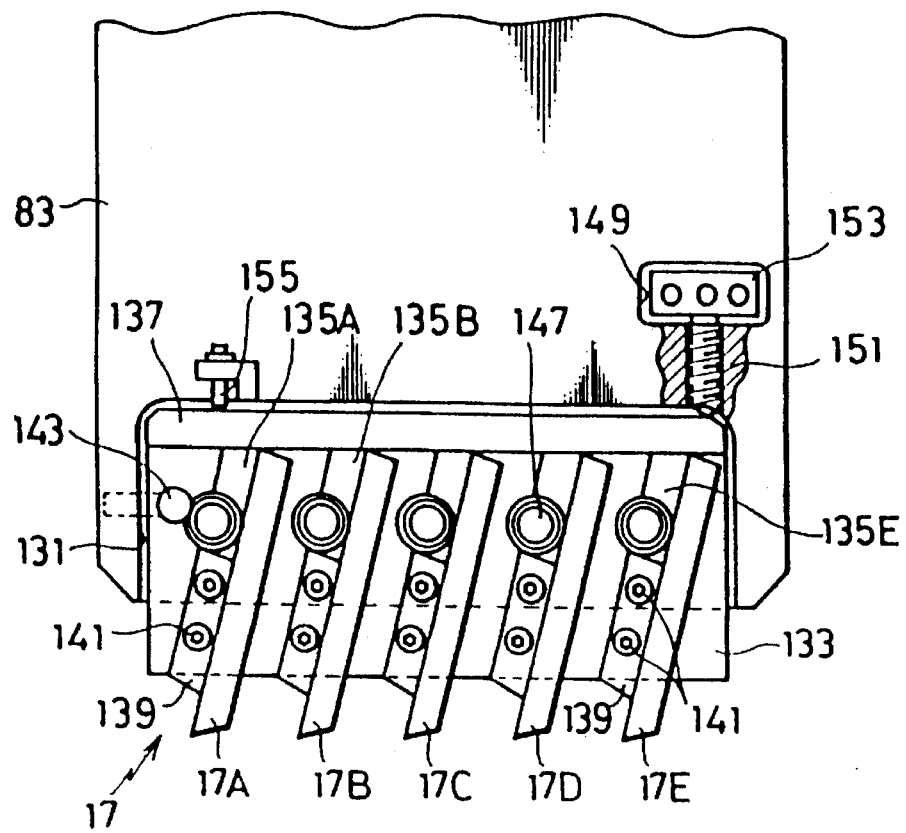
FIG. 9 is a front view showing a tool holder arrangement.
Figure 10:
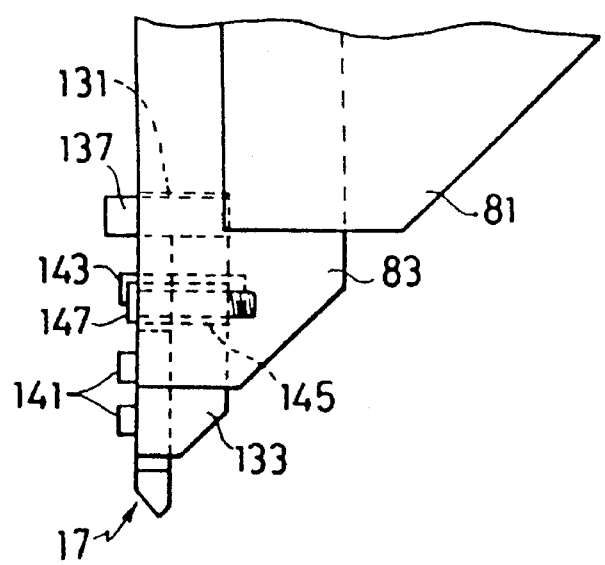
FIG. 10 is a side view when seen from the right side in FIG. 9.

In more detail, as shown in FIG. 9 and 10, a box-shaped recessed portion 131 opened on the front side and the lower side is formed at the lower part of the Z-axis slider 83. Within this recessed portion 131, the cutting tool 17 is supported by a tool holder 133 removably attached to this recessed portion 131. This tool holder 133 is a block formed with a plurality of inclined tool grooves 135A to 135E, into which a plurality of cutting tools 17A to 17E are fitted on the front surface thereof. Further, a back plate 137 is mounted at the upper portion of the tool holder 133. Therefore, each cutting tool 17A to 17E are arranged within each tool groove 135 with each base portion of each tool brought into contact with this back plate 137. Each cutting tool 17A to 17E is fixed by a wedge member 139 provided within the tool groove 135 and plural bolts 141.

The above plural cutting tools 17A to 17E are arranged in such a way that a succeeding cutting tool 17E projects a little more than a preceding cutting tool 17A in order and further a uniform cutting load is applied to each cutting tool 17A to 17E.

The tool holder 133 is pivotally mounted to the recessed portion 131 formed in the Z-axis slider 83 via a pin 143 and simultaneously fixed to the Z-axis slider 83 by plural bolts 147 passed through relatively large-diameter through holes 145 formed in the tool holder 133. Further, a dial 153 for rotating an adjust bolt 151 whose lower end is brought into contact with the tool holder 133 is disposed within a window portion 149 formed over one side of the recessed portion 131 of the Z-axis slider 83.

Owing to this construction, when the dial 153 is rotated under the condition that bolts 147 are a little loosened, the tool holder 133 is pushed down by the adjust bolt 151 so that it is possible to adjust the inclination angle of the tool holder 133. That is, it is possible to adjust the face (rake) angle of the cutting tools 17A to 17E relative to the plate material W by pivoting the tool holder 133 about the pin 143 so that the tool holder 133 can be inclined, thus a V-shaped groove being formed on the surface of the plate material W under desired conditions.

Further, a holder sensor 155 is mounted on the Z-axis slider 83 in order to detect the presence or absence of the tool holder 133 within the recessed portion 131. This holder sensor 155 is of proximity sensor type, for instance which can output a signal to cancel an origin of the cutting tool 17 stored in a control unit whenever the tool holder 133 is removed from the recessed portion 131 of the tool holder 133. Therefore, whenever the tool holder 133 is replaced, an origin of a new cutting tool 17 is required to be set, thus preventing the origin setting from being forgotten carelessly.

Figure 11:
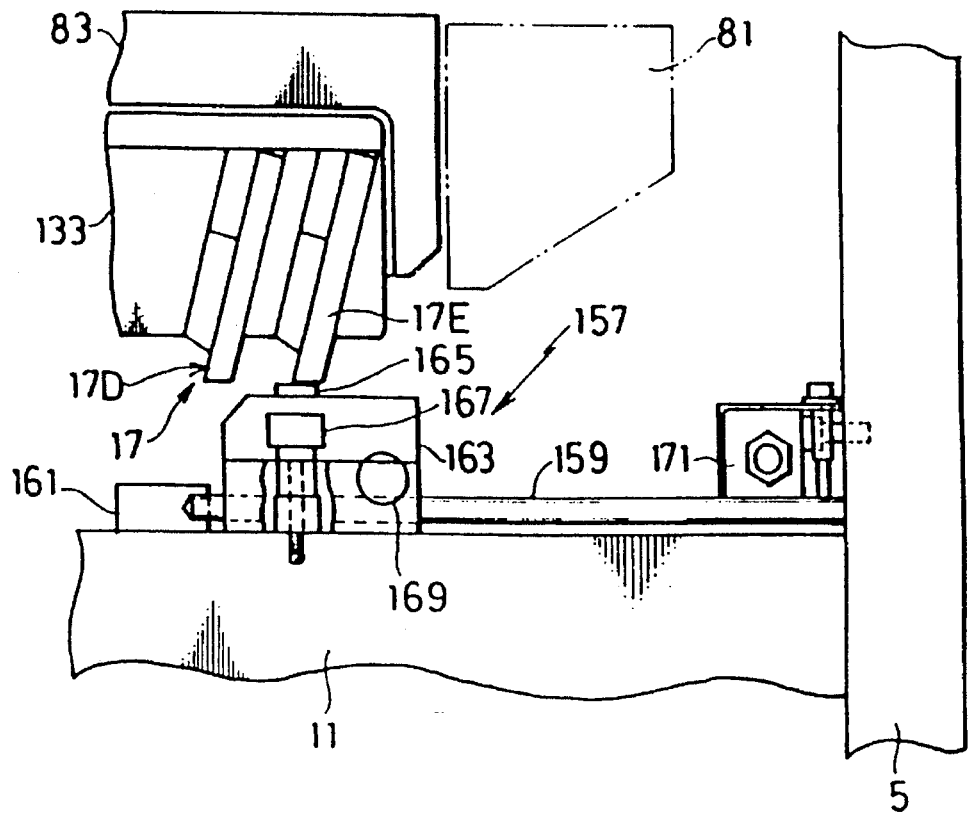
FIG. 11 is a front view showing tool detecting means.

To set an origin of the cutting tool 17, tool detecting means 157 is provided at one end of the work table 11. In more detail, as shown in FIG. 11, a support bar 159 is provided at the upper portion of the work table 11. An end of the support bar 159 is fixed to the side plate 5, and the other end of the support bar 159 is fixed to a support block 161 fixed to the work table 11 by plural bolts.

A detection jig 163 is mounted on the support bar 159, and a sensor 165 such as proximity switch is mounted on the upper surface of the detection jig 163 so as to be actuated. Further, the height of this detection jig 163 provided with the sensor 165 is previously set accurately.

This detection jig 163 is movable to and fro relative to the support bar 159 and moved to a position shown in FIG. 11 and fixed to the work table 11 by a bolt 167 when the coordinates of the cutting tool 17 is set. Since the detection jig 163 is fastened against the work table 11 by the bolt 167, it is possible to determine a reference surface accurately without being subjected to the influence of oil film or heat.

When the detection jig 163 is not used, the bolt 167 is loosened and the jig 163 is shifted for relief to the right side in FIG. 11 by rotating a handle 169 attached to the jig 163.

A proximity switch 171 is mounted on the right side of the support bar 159. The presence or absence of the detection jig 163 can be detected by this proximity switch 171.

The coordinates of the cutting tool 17 can be set by use of the detection jig 163 provided with the sensor 165 of the detecting means 157. The basic concept of setting the coordinates of the cutting tool 17 will be described hereinbelow with reference to FIG. 12.

Figure 12:
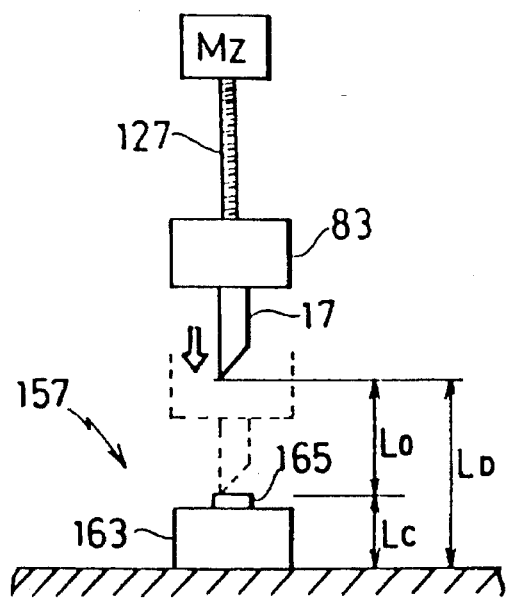
FIG. 12 is a view for assistance in explaining the operation of the tool detecting means.

In FIG. 12, $L_D$ denotes a distance between the top end of the cutting tool 17 mounted at the lower end portion of the Z-axis slider 83 and the upper surface of the work table 11, and $L_c$ denotes a distance between the upper surface of the sensor 165 mounted on the upper surface of the detection jig 163 and the upper surface of the work table 11.

Now, when the Z-axis servomotor $M_z$ is driven to move down the Z-axis slider 83, the top end of the cutting tool 17 stops when brought into contact with the sensor 165. A stroke $L_O$ of this cutting tool 17 can be detected by the encoder mounted on the Z-axis servomotor $M_z$. If this detected stroke is $L_O$, $L_D=L_O+L_C$. Therefore, when the cutting tool 17 is returned to the original position, the coordinates of the top end of the cutting tool 17 is located at a position a distance $L_D$ upward away from the upper surface of the work table 11. That is, this position $L_D$ is set as a coordinate origin of the cutting tool 17.

Figure 13:
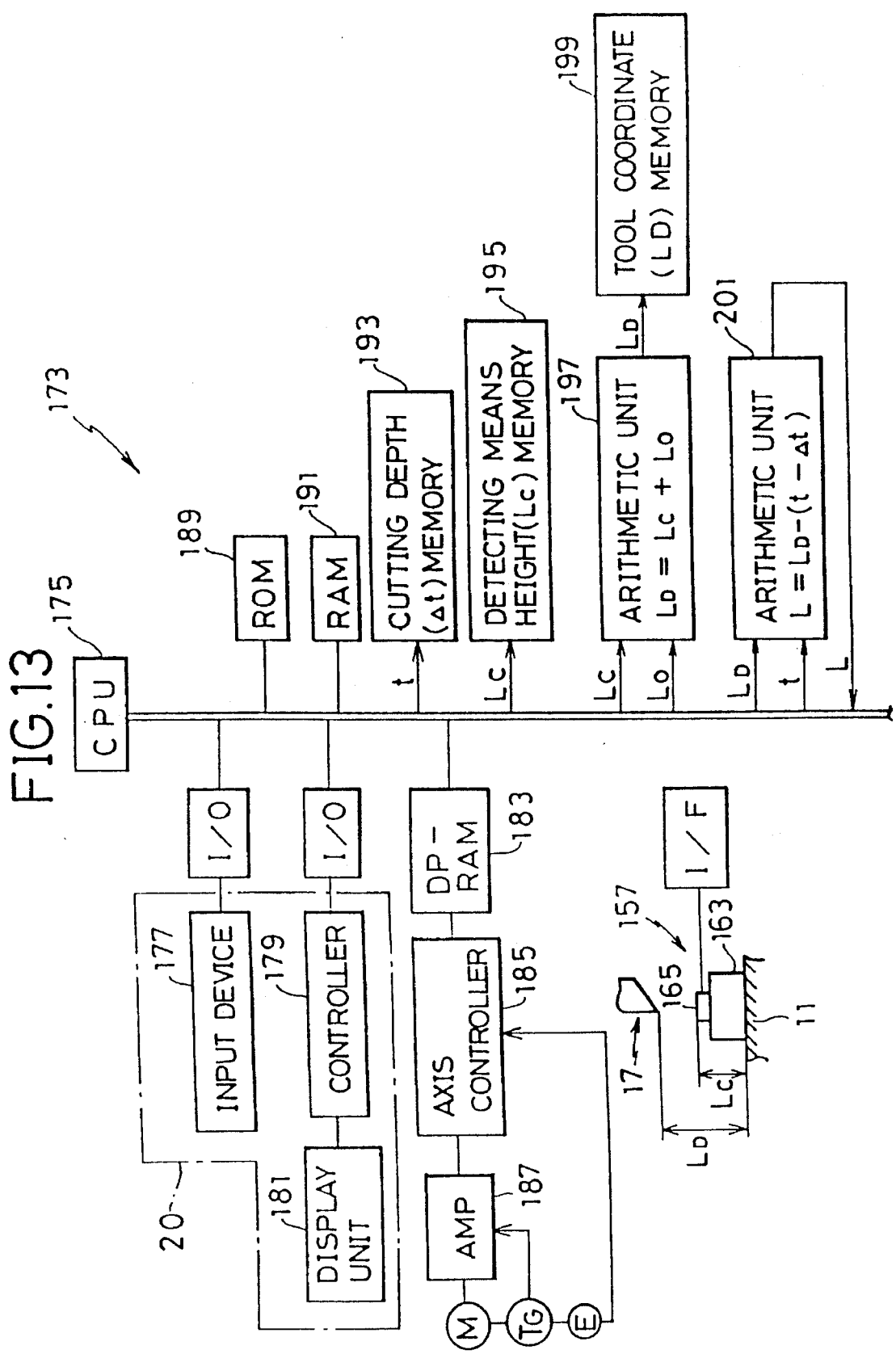
FIG. 13 is a block diagram of the control unit of the machine.

FIG. 13 shows a block diagram of a control unit 173 of the V-shaped groove forming machine which can cut a V-shaped groove on the basis of the basic concept of setting the coordinates of the cutting tool 17.

In FIG. 13, an input device 177 provided in the control board 20 is connected via an I/O interface to a central processing unit (CPU) 175 of the control unit 173. This input device 177 is a paper type reader or a keyboard through which data related to a plate thickness, a plate length, a processing program, etc. are entered. To the CPU 175, a display unit 181 such as cathode ray tube (CRT) is connected via an I/O interface and a controller 179. This controller 179 controls data to be displayed on the screen of the display unit 181. This display unit 181 displays operation status, cutting tool positions, program data, alarms, etc.

A DP-RAM 183 is connected to the CPU 175; an axis controller 185 is connected to the DP-RAM 183; and each-axis servomotor M (servomotors $M_x$, $M_y$ and $M_z$ in this embodiment) is connected to the axis controller 185 via an amplifier 187. This DP-RAM 183 is an accessible bi-directional RAM. This axis controller 185 is a module for controlling a servo system including the amplifier 187, the servomotor M, a position detector such as tachogenerator. $T_G$, encoder E, etc. when this controller 185 is configured so as to be intelligent, it is possible to reduce the load to the CPU.

Further, a ROM 189 and a RAM 191 are connected to the CPU 175. A groove forming program is stored in this ROM 189. Data processed by the CPU 175 are stored in the RAM 191 and read from the RAM where necessary for data processing.

The sensor 165 and the plate thickness detecting device mounted on the upper surface of the detection jig 163 of the detecting means 157 are connected to the CPU 175 via an I/F interface.

A cutting depth $\Delta t$ to a plate thickness previously set or actually detected by the detecting device and a height $L_C$ of the detecting means 157 (a distance between the upper surface of the sensor 165 and the upper surface of the work table 11), etc. are entered to the CPU 175 via the input devices 177, and stored, respectively in a plate cutting depth memory 193 and a detecting means height memory 195.

When the Z-axis servomotor $M_z$ is driven, the cutting tool 17 on the Z-axis slider 83 comes down, and is brought into contact with the sensor 165 mounted on the upper surface of the detecting jig 163. Since the sensor 165 detects this contact and is activated, the downward motion of the cutting tool 17 stops, and a movement stroke $L_O$ of the cutting tool 17 is detected and entered into the CPU 175.

A height $L_C$ previously stored in the detecting means height memory 195 and the movement stroke $L_O$ of the cutting tool 17 are given to an arithmetic unit 197 connected to the CPU 175 as calculating means. This arithmetic unit 197 calculates $L_D=L_C+L_O$. This value $L_D$ calculated by the arithmetic unit 197 is a position indicative of a top end of the cutting tool 17, which is once stored in a tool coordinate memory 199 connected to the arithmetic unit 197. By setting this position $L_D$ of the cutting tool 17 as a cutting tool origin, it is possible to automatically set a cutting tool origin, without entering the distance measured by another measuring instrument whenever the cutting tool has been exchanged.

For instance, if the thickness of the plate material W is t, a cutting depth $\Delta t$ relative to the thickness t stored in the plate cut depth memory 193 and a tool coordinate value $L_O$ stored in the tool coordinate memory 199 are given to the arithmetic unit 201 connected to the CPU, and then calculated to obtain a tool movement stroke $L=L_D-(t-\Delta t)$ of the cutting tool 17, which is required to form a groove. Therefore, it is possible to automatically form a groove by moving the cutting tool at this tool height L.

The operation of setting the coordinates of the cutting tool 17 will be described with reference to a flowchart shown in FIG. 14.

Figure 14:
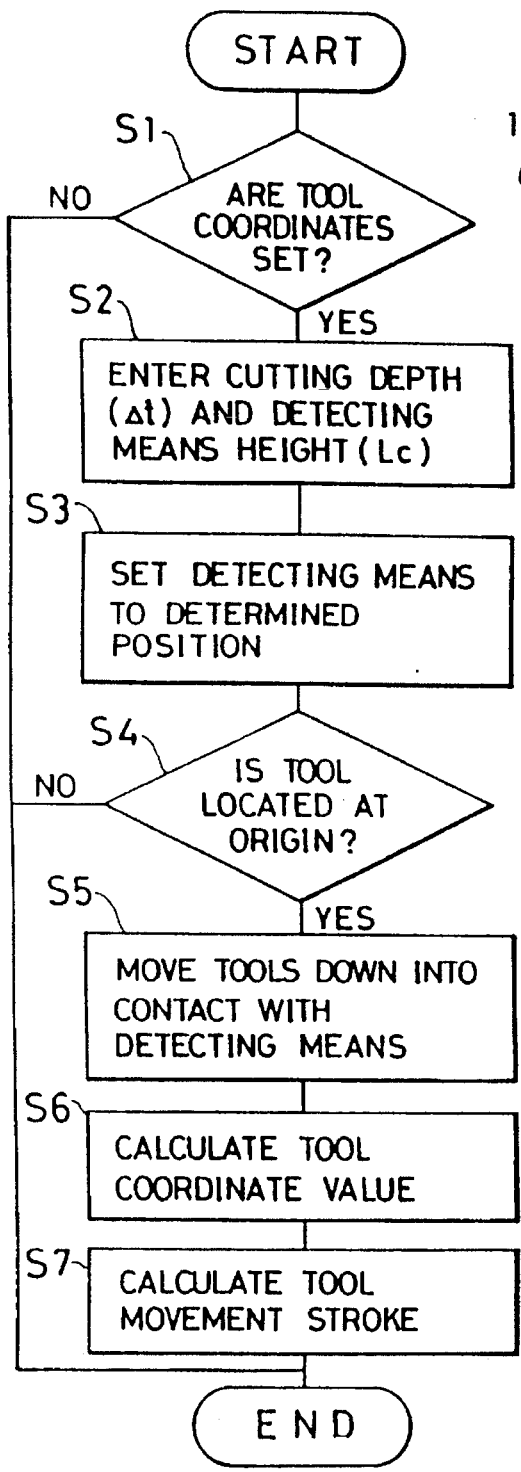
FIG. 14 is a flowchart of the machine.

In FIG. 14, in step S1, control determines whether it is necessary to set the coordinates of the cutting tool 17. If control determines that the setting is unnecessary, control ends. If control determines that the setting is necessary, control proceeds to step S2, in which the cutting depth $\Delta t$ to the plate material W and the height $L_C$ of the detecting means 157 are inputted through the input device 177 and stored in the plate cut depth memory 193 and the detecting means height memory 195, respectively. Thereafter, in step S3, control sets the detecting means 157 to a predetermined position relative to the work table 11. In step S4, control discriminates whether the cutting tool 17 is located to an origin. If not located at the origin, control ends. If control determines that the cutting tool 17 is located at the origin, in step S5 control moves down the cutting tool 17, and the cutting tool stops when brought into contact with the upper surface of the sensor 165 mounted on the upper surface of the detection jig 163. Then, in step S6, the movement stroke $L_O$ of the cutting tool 17 and the height $L_C$ of the detecting means 157 are transferred to the arithmetic unit 197 to obtain $L_D = L_C + L_O$. The calculated value $L_D$ is the coordinate value of the cutting tool and once stored in the tool coordinate memory 199.

In step S7, the arithmetic unit 201 calculates a tool movement stroke (height) $L = L_D - (t - \Delta t)$ under consideration of the cutting depth $\Delta t$ of the plate material W with this calculated position $L_D$ as an origin of the coordinates of the cutting tool 17, in order to form a groove on the plate material W on the basis of this calculated tool height L.

As described above, since the setting operation of the coordinates of the cutting tool 17 can be made automatically without measuring the height of the cutting tool with another measurement instrument, it is possible to facilitate the cutting tool coordinate setting work at a short time and also to improve the precision of the groove cutting operation.

After the cutting tool 17 has been set to an origin position in the Z-axis direction as described above, a V-shaped groove is formed on the upper surface of the plate material W by controllably driving the servomotors $M_X$, $M_Y$ and $M_Z$ in accordance with a cutting program stored in the ROM 189.

As already understood, the cutting tool 17 can be moved in the X-axis direction by driving the X-axis servomotor $M_X$ and in the Z-axis direction by driving the Z-axis servomotor $M_Z$. Therefore, it is possible to form a V-shaped groove 203 on the plate material W, as shown in FIGS. 15 and 16, by controlling the X-axis servomotor and the Z-axis servomotor $M_Z$ in dual-axis control manner.

Figure 15:
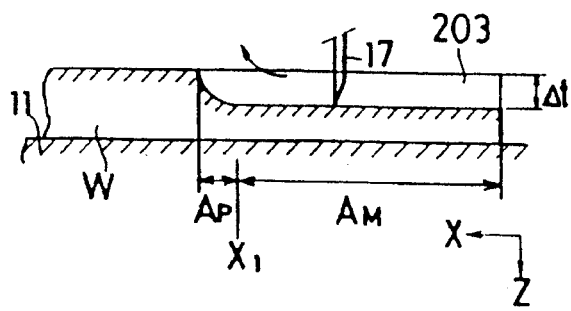
FIG. 15 and 16 show examples of V-shaped grooves to be formed.

In more detail, in FIG. 15 after the plate material W has been fixed on the work table 11, a cutting depth $\Delta t$ is determined on the basis of the calculated result of the arithmetic unit 201; the cutting tool is moved horizontally in the X-axis direction to a position $X_1$ over a distance $A_M$, and then upward from a position $X_1$ over a distance (midway cutting end interval) $A_P$ by controlling two X- and Z-axes in circular arc interpolation method, in order to form a V-shaped groove 203 of midway cutting end. The arrow in FIG. 15 indicates the movement direction of the cutting tool 17.

Figure 16:
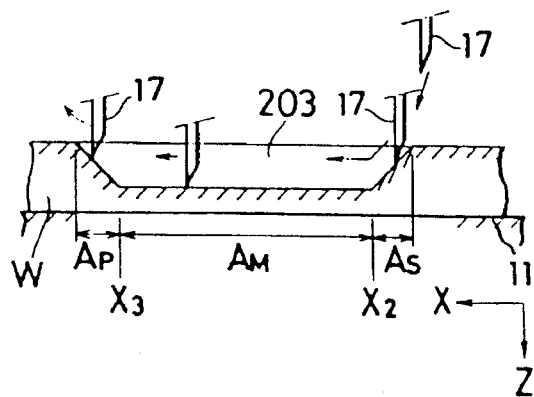

In FIG. 16, after the plate material W has been fixed on the work table 11, the cutting tool is moved obliquely downward to a position $X_2$ over a distance (midway cutting start interval) $A_S$ by controlling two X- and Z-axes in linear interpolation method, horizontally in the X-axis direction to a position $X_3$ over a distance $A_M$, and then obliquely upward from a position $X_3$ over a distance (midway cutting end interval) $A_P$ by controlling two X- and Z-axes again in linear interpolation method, in order to form a V-shaped groove 203 of midway cutting start and midway cutting end between the two positions $X_2$ and $X_3$.

As shown in the above examples, in the groove forming machine of the present invention, it is possible to start and end cutting at any desired midway positions on the plate material W.

Further, since the cutting tool 17 is controlled in servo-system, being different from the so-called M function for moving the cutting tool 17 up and down by a NC machine, it is possible to smoothly and uniformly determine the down motion end point and up motion start point, without damaging the cutting tool 17.

In comparison between the two control methods of two X- and X-axis control shown in FIGS. 15 and 16, the linear interpolation method shown in FIG. 16 is more advantageous. This is because in the case of the circular arc interpolation shown in FIG. 15, since a circular arc radius must be determined according to the thickness of the plate material W, the speed control is more difficult in obtaining a cutting surface of good finish.

Figure 17:
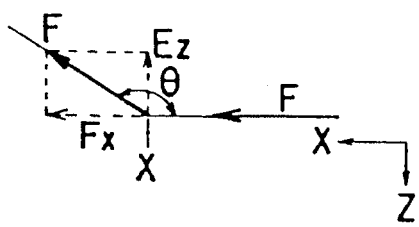
FIG. 17 is a view for assistance in explaining an embodiment of linear interpolation.

FIG. 17 shows a preferred example of forming a groove by modifying the linear interpolation method shown in FIG. 16. That is, in an example shown in FIG. 17, when control changes from only one X-axis control to two X- and Z-axis interpolation control, the cutting speed of the cutting tool 17 is determined to be the same speed F in both the X- and Z-axis controls. The same cutting speed F is determined also when control changes from two X- and Z-axis interpolation control at midway cutting start to one X-axis control. In other words it is preferable to make constant the cutting speed relative to the cutting surface of the plate material W (a resultant speed in the case of two-axis interpolation) at least one bending point in the midway cutting start or end operation. As described above, when the cutting speed is determined constant at the cutting start and end point, the cutting precision can be improved and it is possible to control two axis control more easily. These advantages have been verified on the basis of a plurality of experiments.

FIG. 18 is an illustration for showing an example of three X-, Y- and Z-controls. In this example, two V-shaped grooves extending from a point $P_2$ to a point $P_4$ and from a point $P_7$ to a point $P_8$ (plate left end) can be formed by controlling the axes shown by parentheses in sequence of points $P_0, P_1 \ldots P_9$.

In more detail, plate material clamps (diagrammatically shown) 59 are moved in the Y-axis direction relative to the cutting tool 17 located at point $P_0$. Then, the cutting tool 17 is moved down at point $P_1$ in the Z-axis direction and horizontally from point $P_2$ (right side from the cutting start point, to point $P_4$ in the X-axis direction with the cutting tool 17 kept at a constant height for cutting operation. At point $P_4$, the cutting tool 17 is moved obliquely upward for midway cutting end in accordance with two X- and Z-axis linear interpolation (as explained with reference to FIG. 16). Thereafter, the cutting tool 17 is moved from point $P_5$ to point $P_6$ (the succeeding cutting start point) in accordance with two X- and Y-axis linear interpolation. In same way, the cutting tool 17 is controlled in the order of Z, ZX, X, ZX and XY directions, in order to form two V-shaped grooves (one is ended midway, the other is started midway).

As described above, it is possible to realize a midway cutting start or a midway cutting end by appropriately combining two-axis controls such as, for example XZ, ZY, etc., thus improving the cutting efficiency.

As described above, in the groove forming machine 1 of the present invention, since it is possible to perform midway cutting starts and midway cutting ends by moving the clamps 59, as shown in FIG. 19, two midway cutting end V-shaped grooves 203 and two midway cutting start V-shaped grooves 203 can be formed on both sides of a plate W. In this example shown in FIG. 19, the middles of the two adjacent V-shaped grooves 203 are cut off along cut-out lines 204 by a cutting (e.g. laser cutting machine); thereafter two shaded areas 25 near the ends of the V-shaped grooves 203 are punched out by a punch press (not shown), for instance; and lastly the four cut-out portions are bent along each V-shaped groove 203 by a bending machine (not shown,) for instance in order to manufacture products provided with flange portions 207 such as front doors, window frames, etc.

As described above, in the two-axis control method of the V-shaped groove forming machine of the present invention, since the X-axis slider 81 movable in the X-axis direction and the cutting tool 17 movable in the Z-axis direction are both interpolation controlled at midway cutting starts and/or midway cutting ends, it is possible to form midway start and/or end V-shaped grooves at higher precision.

In particular, in two-axis linear interpolation, the interpolation control is easy and therefore the cutting precision at flections is high. Further, it is possible to further improve the finish precision when the resultant cutting tool speed is equal to the linear movement speed of the X-axis carriage in the linear interpolation at midway cutting start or midway cutting end.

By the way, when the plural cutting tools 17A to 17E are worn out, it is necessary to regrind the cutting tools 17A and 17E and remount them on the cutting tool holder 133. However, in the present embodiment, it is possible to grind the cutting tools 17A to 17E under the conditions that the cutting tools are kept mounted on the tool holder 133.

In more detail, as shown in FIG. 21, a grinding device 209 for grinding the face (rake) surface of the cutting tools 17A to 17E is pivotally mounted on one end of the work table 11. To pivot the grinding device 209, various mechanisms can be adopted. In this embodiment, however, the following structure is adopted:

A pivotal housing 215 is pivotally supported via a pivotal axle 213 on a pillow block 211 mounted on the work table 11. A grinding wheel 219 is fixed to one end of a rotary shaft 217 rotatably supported by this pivotal housing 215. This rotary shaft 217 is linked with a motor 211 mounted on the pivotal housing 215, and a gear 223 fixed to this rotary shaft 217 is in mesh with an intermediate gear 227 fixed to an intermediate shaft 225 supported by the pivotal housing 215. An appropriate shaped cylinder cam 229 is removably attached to one end of this intermediate shaft 225 with a key or bolt.

The end surface of the cylindrical cam 229 is in contact with a cam follower 233 supported by a bracket 231 fixed to a pillow block 211 or the work table 11. Further, an elastic member 235 such as a coil spring is provided between this bracket 231 and the pivotal housing 215.

Therefore, when the grinding wheel 219 is rotated by driving the motor 221, the cylindrical cam 229 is rotated by way of the gear 223 and the intermediate gear 227. Therefore, the pivotal housing 215 is pivoted to and fro in FIG. 21 because the cylindrical cam 229 is in contact with the cam follower 233. As a result, it is possible to bring the grinding wheel 219 into contact with the face surface of the cutting tools 17A to 17E in sequence to grind the cutting tools 17A to 17E.

As described above, it is possible to change the pivotal period and the pivotal amplitude of the pivotal housing 215 by exchanging the cylindrical cam 229 when grinding the cutting tools 17A to 17E.

That is, according to the present invention it is possible to grind a plurality of cutting tools 17A to 17E mounted on the tool holder 133, thus improving the grinding work efficiency.

Without being limited to the above-mentioned embodiments, the present invention can be modified into other modifications in various modes. For instance, it is possible to omit the making-off line detecting device or scribing of making-off lines on the upper surface of the plate material W, if a position at which a V-shaped groove is formed can automatically be located just under the cutting tool by continuously detecting the movement position of the Y-axis carriage.

Further, in order to facilitate removing of chips produced when a groove is formed in the plate material W, it is possible to divide the work table into two, and to move the cutting tools upward between these two divided tables so that a groove can be formed in the lower surface of the plate material.

Further, when a groove inclined with respect to the end edge of the plate material W is required to be formed, at least one of the plate clamp device is constructed so as to be movable back and force in order to incline the plate material W back and forth. In practice, for instance, a support beam pivotable back and forth is mounted on the Y-axis carriage, and a plurality of clamp devices are mounted on this support beam.

What is claimed is:

1. A groove forming machine for forming a V-shaped groove in a plate material, comprising:

a frame;

a guide rail mounted on the frame and extending in a horizontal direction;

a slider mounted on the guide rail so as to be movable in the horizontal direction;

a ball screw mounted on the frame in parallel with the guide rail, wherein the ball screw is prevented from rotating relative to the frame;

a nut member mounted on the slider, the nut member being engaged with the ball screw and rotatable relative to the ball screw;

a motor mounted on the slider coupled to the nut member so as to rotate the nut member relative to the guide rod so that the nut member moves along the guide rod with the slider; and a cutting tool mounted on the slider for forming a V-shaped groove in the plate material.

2. The groove forming machine of claim 1, wherein the ball screw includes first and second ends, wherein the first end of the ball screw is supported on the frame so as to be immovable relative to the frame and the second end of the ball screw is supported on the frame so as to be movable in the axial direction of the ball screw.

3. The groove forming machine of claim 1, wherein the ball screw has an axis and the second end of the ball screw is movable in a certain direction along the axis further including an elastic means for moving the ball screw relative to the frame.

* * * * *